US012086333B2

(12) United States Patent
Hou et al.

(10) Patent No.: US 12,086,333 B2
(45) Date of Patent: Sep. 10, 2024

(54) TOUCHPAD DEVICE WITH SUBSTRATE FOR RESTRICTING SWING MOTION OF TOUCH PANEL

(71) Applicant: Chicony Electronics Co., Ltd., New Taipei (TW)

(72) Inventors: Po-Chun Hou, New Taipei (TW); Po-Hsin Li, New Taipei (TW); Chi-Hung Cheng, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/446,913

(22) Filed: Aug. 9, 2023

(65) Prior Publication Data

US 2024/0069654 A1 Feb. 29, 2024

(30) Foreign Application Priority Data

Aug. 26, 2022 (TW) .................................. 111132379

(51) Int. Cl.
*G06F 3/0354* (2013.01)
*G06F 3/041* (2006.01)

(52) U.S. Cl.
CPC .......... *G06F 3/03547* (2013.01); *G06F 3/041* (2013.01); *G06F 2203/04102* (2013.01); *G06F 2203/04103* (2013.01)

(58) Field of Classification Search
CPC ....... G06F 1/1616; G06F 1/1656–1658; G06F 1/1675; G06F 1/1681; G06F 1/1684; G06F 1/169; G06F 3/0227; G06F 3/033; G06F 3/0338; G06F 3/03547; G06F 3/041; G06F 3/04142; G06F 2203/04103; G06F 2203/04105

See application file for complete search history.

(56) References Cited

U.S. PATENT DOCUMENTS

| 9,645,615 | B2* | 5/2017 | Lee | G06F 1/169 |
| 10,725,567 | B1* | 7/2020 | Huang | G06F 1/1671 |
| 2013/0207928 | A1* | 8/2013 | Takata | G06F 3/03547 345/174 |
| 2015/0169117 | A1* | 6/2015 | Ho | H01H 3/12 345/173 |
| 2017/0024029 | A1* | 1/2017 | Kitamura | G06F 1/169 |

(Continued)

FOREIGN PATENT DOCUMENTS

| CN | 206931071 U | 1/2018 |
| TW | 201710850 A | 3/2017 |

*Primary Examiner* — Keith L Crawley
(74) *Attorney, Agent, or Firm* — MUNCY, GEISSLER, OLDS & LOWE, PC (57) ABSTRACT

A touchpad device includes a substrate and a touch panel. The substrate includes a main plate, a first limiting plate, and a first flexible member. The main plate has a long side and a short side. The first limiting plate has a first stopping portion, the first flexible member is integrally connected between the long side and the first limiting plate, and the first limiting plate is adjacent to the short side. The touch panel is disposed above the substrate. The touch panel has a bottom surface, a pivot side of the bottom surface is disposed on the main plate, the first limiting plate of the substrate is fixed on the bottom surface and adjacent to a first side of the bottom surface, and the first stopping portion of the first limiting plate protrudes from an edge portion of the first side.

17 Claims, 11 Drawing Sheets

(56) References Cited

U.S. PATENT DOCUMENTS

2017/0322591 A1* 11/2017 Lee .................. G06F 1/169
2019/0384426 A1* 12/2019 Huang ............... G06F 3/0362
2022/0050500 A1* 2/2022 Liu .................. G06F 3/03547

* cited by examiner

TOUCHPAD DEVICE WITH SUBSTRATE FOR RESTRICTING SWING MOTION OF TOUCH PANEL

CROSS-REFERENCE TO RELATED APPLICATION

This non-provisional application claims priority under 35 U.S.C. § 119(a) to Patent Application No. 111132379 filed in Taiwan, R.O.C. on Aug. 26, 2022, the entire contents of which are hereby incorporated by reference.

BACKGROUND

Technical Field

The instant disclosure relates to an input device, in particular, to a touchpad device.

Related Art

Touchpads are common input devices widely applied in computers. The touchpad is provided for sensing the movement or pressing of a user's finger(s) to control the cursor to perform an action (e.g., to move, to click, or the like).

SUMMARY

A touchpad known to the inventor has a touch panel and a substrate. The touch panel has a pivot side, and the touch panel is pivotally fixed on the substrate through the pivot side. When a portion of the touch panel away from the pivot side is pressed, the touch panel swings downward with respect to the substrate by taking the pivot side as the swing axis so as to generate corresponding signal(s).

In general, the touchpad is usually assembled inside the housing of an electronic device, and the housing has an opening to expose the touch panel for user's operation. Moreover, in order to prevent the touch panel from protruding out of the surface of the housing to change the appearance of the product and to affect the operation feelings of the user, several limiting members are further assembled on the touchpad to limit the height of the touch panel. However, for achieving such configuration, additional molding processes for manufacturing the limiting members are needed such that the manufacturing costs for the touchpad product increases. Moreover, during the assembling process of the touchpad product, limiting members are assembled with the touchpad individually, so that the production efficiency of the touchpad product decreases and the weight of the touchpad product increases.

In view of this, in one embodiment, a touchpad device is provided. The touchpad device comprises a substrate and a touch panel. The substrate comprises a main plate, a first limiting plate, and a first flexible member. The main plate has a long side and a short side, the first limiting plate has a first stopping portion, the first flexible member is integrally connected between the long side and the first limiting plate, and the first limiting plate is adjacent to the short side. The touch panel is disposed above the substrate. The touch panel has a bottom surface, the bottom surface has a pivot side and a swing side opposite to the pivot side and has a first side and a second side opposite to the first side, the first side and the second side are connected between the pivot side and the swing side, the pivot side is disposed on the main plate, the first limiting plate of the substrate is fixed on the bottom surface and adjacent to the first side, and the first stopping portion of the first limiting plate protrudes from an edge portion of the first side.

Based on the above, in the touchpad device according to one or some embodiments of the instant disclosure, the first flexible member is connected between the long side of the main plate and the first limiting plate (that is, in some embodiments, the main plate, the first flexible member, and the first limiting plate are integrally formed as a one-piece structure), and the first stopping portion of the first limiting plate protrudes from an edge portion of the touch panel. Therefore, the height position of the touch panel can be directly limited by the first stopping portion of the substrate, and additional limiting members are not necessarily required. Hence, the manufacturing costs and the number of the assembling steps of the touchpad device can be reduced, thereby increasing the production efficiency of the product and decreasing the weight of the product.

BRIEF DESCRIPTION OF THE DRAWINGS

The disclosure will become more fully understood from the detailed description given herein below for illustration only, and thus not limitative of the disclosure, wherein.

DETAILED DESCRIPTION

It should be noted that, in the descriptions for the embodiments, the ordinal numbers, e.g., "first" and "second" are used to describe different elements, and these elements are not limited due to the use of these ordinal numbers. Moreover, in all the drawings, the same reference numbers are used to indicate the same or similar elements.

Figure 1:
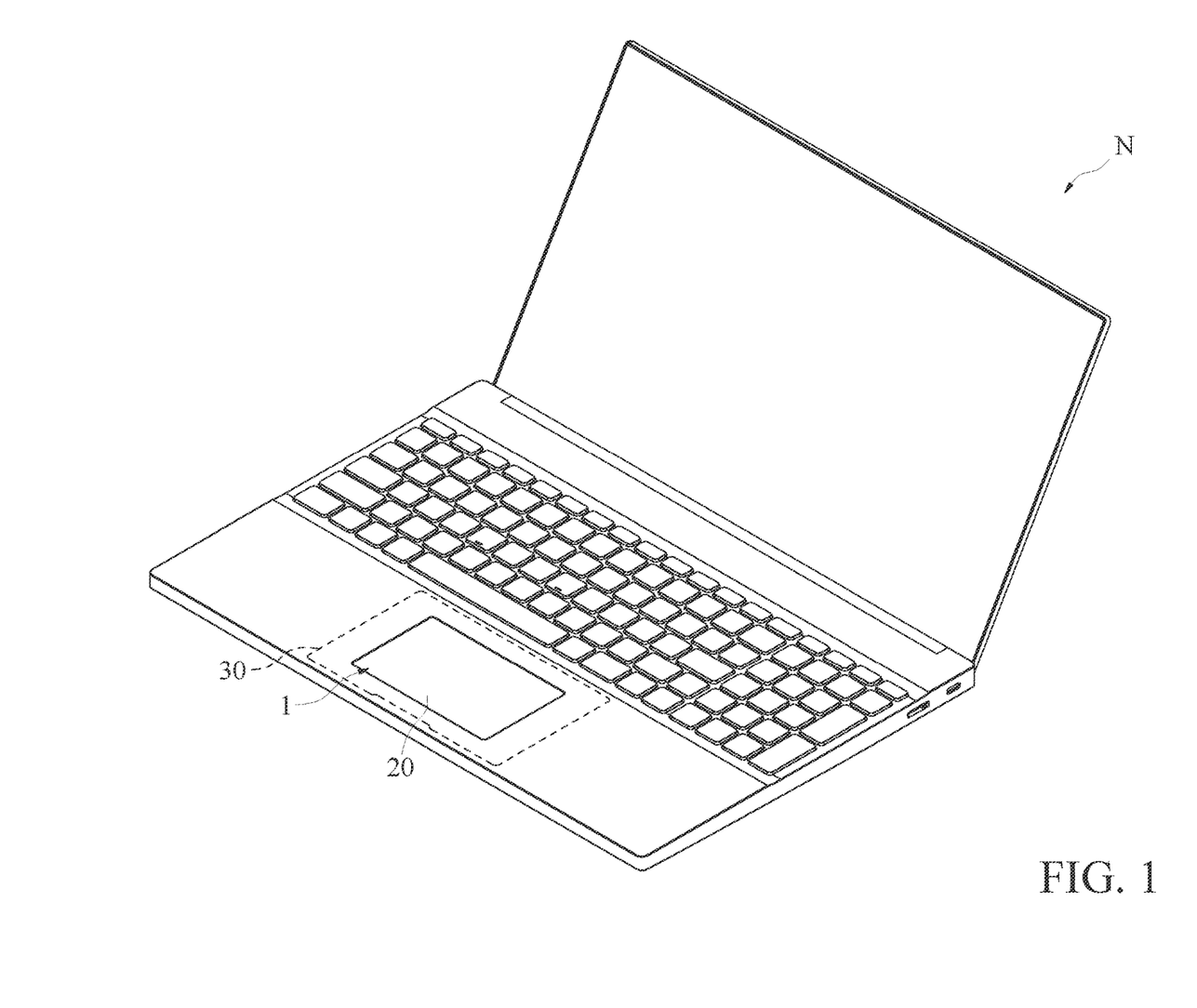
FIG. 1 illustrates a schematic application view of a touchpad device according to an exemplary embodiment of the instant disclosure.
Figure 2:
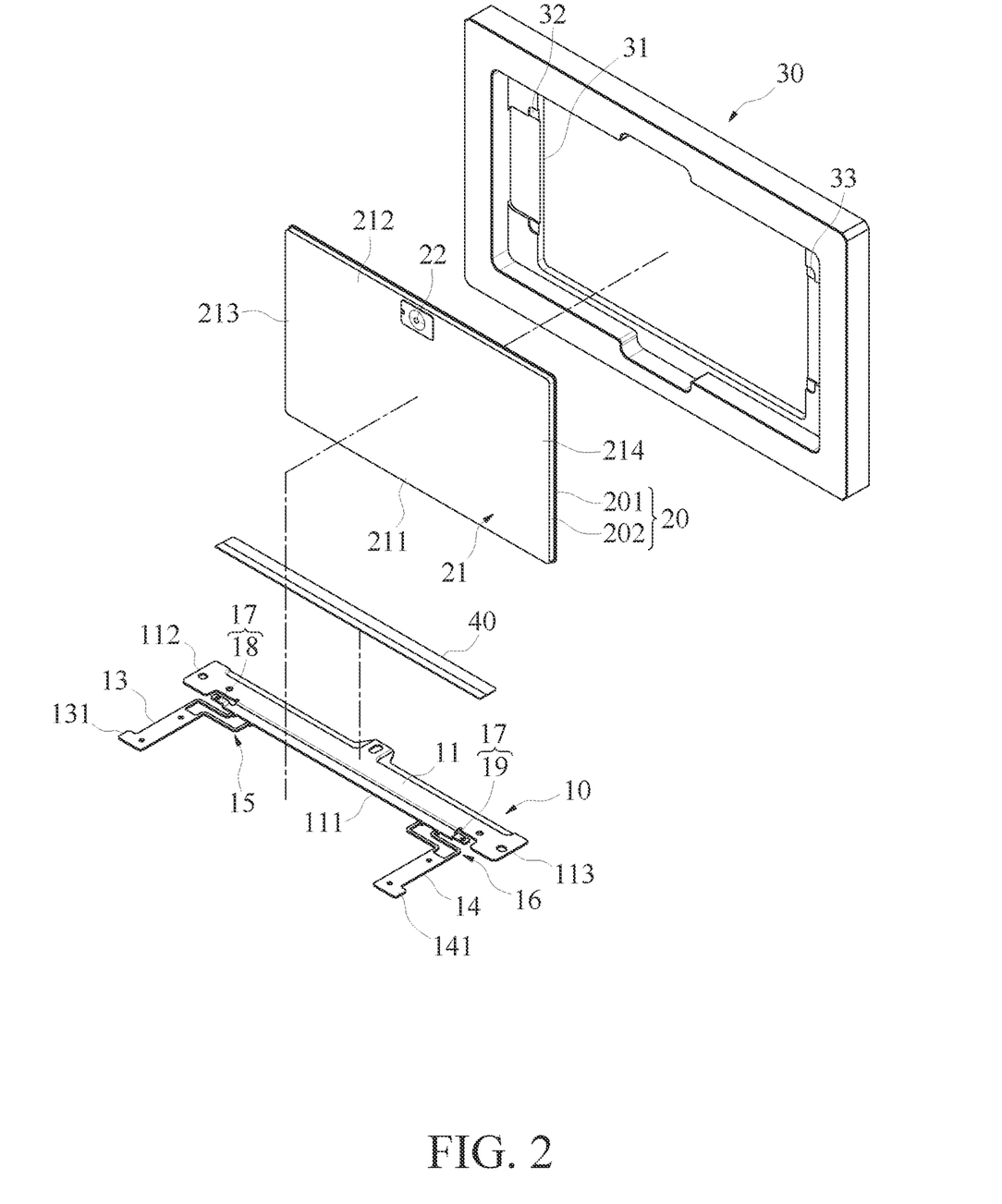
FIG. 2 illustrates an exploded view of a touchpad device according to a first embodiment of the instant disclosure.

As shown in FIG. 1 and FIG. 2, according to one or some embodiments of the instant disclosure, the touchpad device 1 (for example, a touchpad or a trackpad) may be applied in a computer product, and the user can operate the touchpad device 1 by sliding or pressing the touchpad device 1 with the user's finger(s) so as to control the movement of the cursor or to generate corresponding control signal(s). For example, as shown in FIG. 1, in this embodiment, the touchpad device 1 is applied in a notebook computer N, but the instant disclosure is not limited thereto. In some embodiments, the touchpad device 1 may be applied in other portable computers (e.g., tablet computers). Alternatively, in some embodiments, the touchpad device 1 may be an individual device and may be capable of externally connected to a portable computer, but the instant disclosure is not limited thereto.

Figure 3:
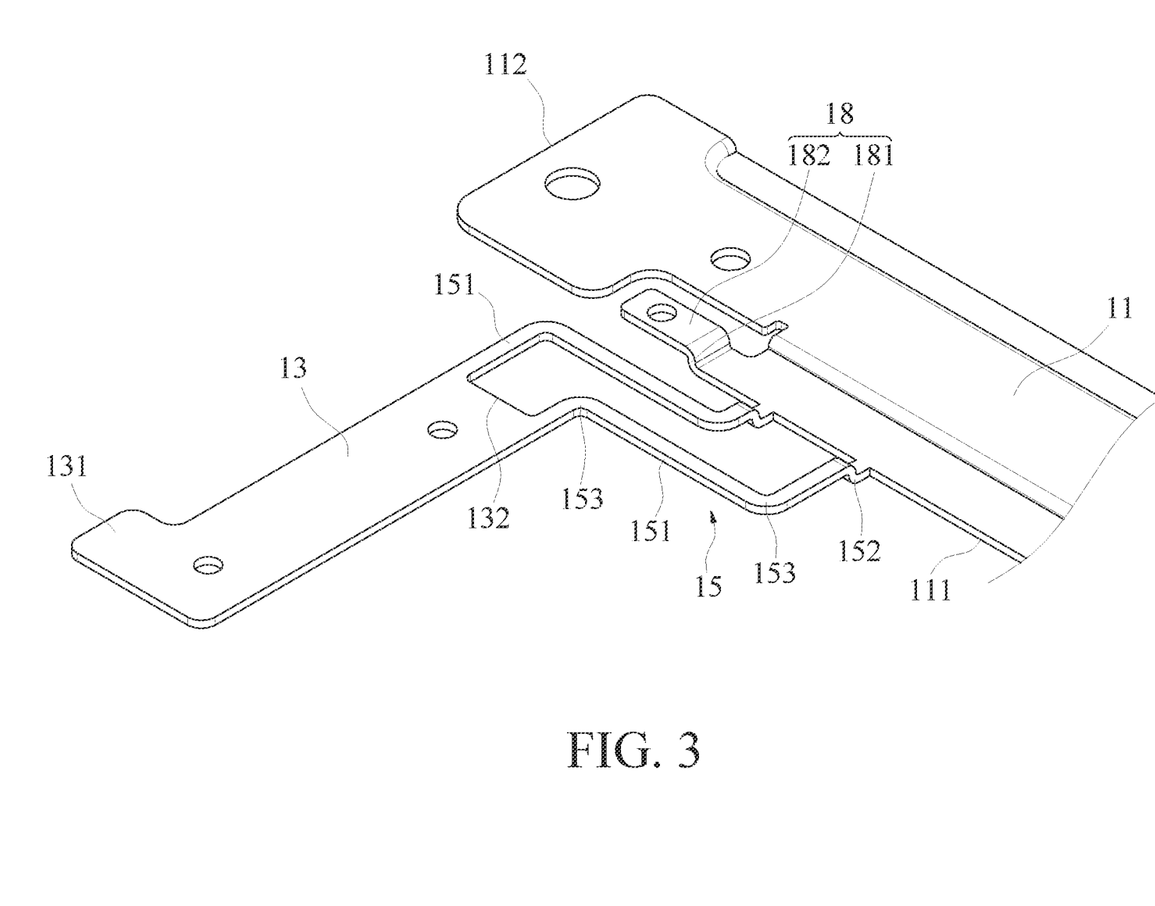
FIG. 3 illustrates an enlarged partial perspective view of the touchpad device of the first embodiment.
Figure 4:
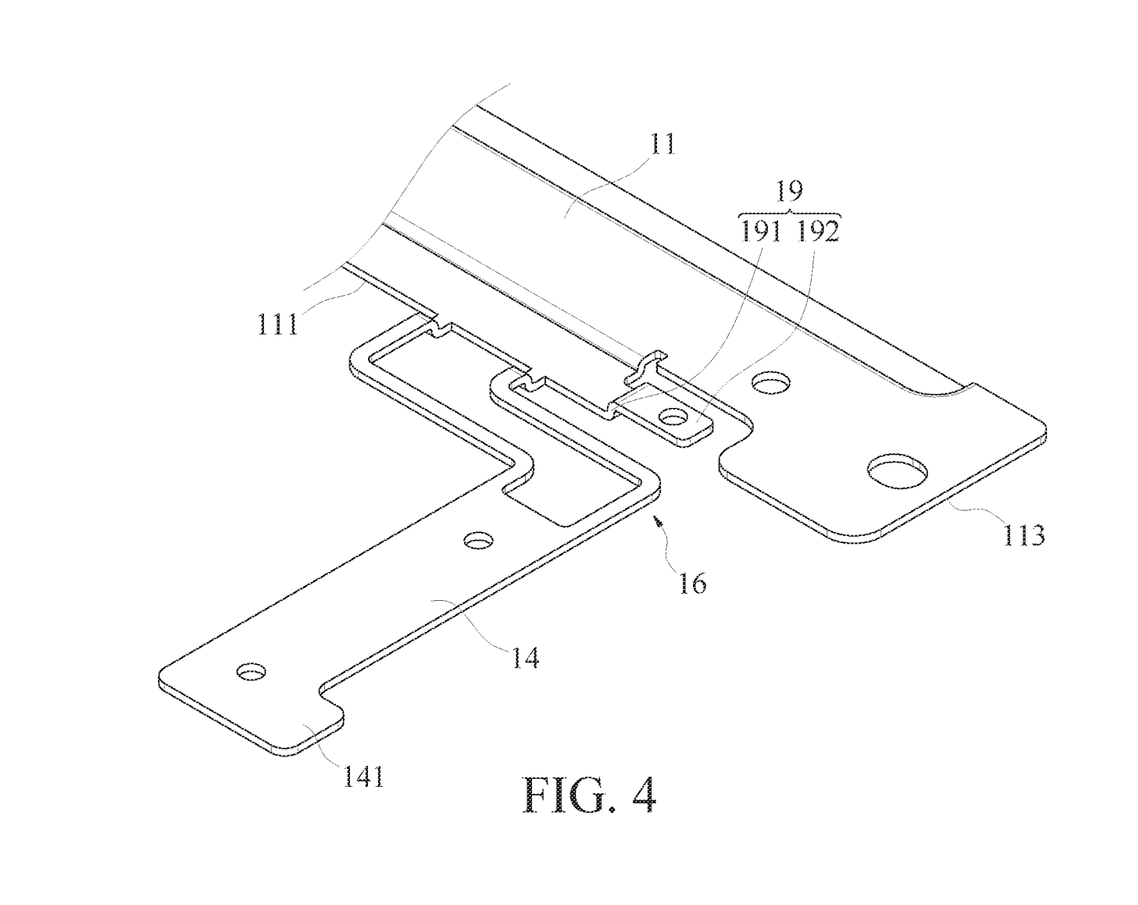
FIG. 4 illustrates another enlarged partial perspective view of the touchpad device of the first embodiment.

As shown in FIG. 2 to FIG. 4, in the first embodiment, the touchpad device 1 comprises a substrate 10 and a touch panel 20. The substrate 10 comprises a main plate 11, a first limiting plate 13, a second limiting plate 14, a first flexible member 15, and a second flexible member 16. In this embodiment, the main plate 11 is an elongated bar-shaped plate and has a long side 111 and two opposite short sides 112, 113. The first limiting plate 13 may be a plate with various shapes; for example, the first limiting plate 13 may be elongated bar-shaped, rectangular shaped, square shaped, or other irregular shaped. The first limiting plate 13 has a first stopping portion 131, and the first limiting plate 13 is adjacent to the short side 112 of the main plate 11. The first stopping portion 131 is a plate integrally extending from one side of the first limiting plate 13, and the first stopping portion 131 is configured to limit the height position of the touch panel 20. Likewise, the second limiting plate 14 may be a plate with various shapes; for example, the second limiting plate 14 may be elongated bar-shaped, rectangular shaped, square shaped, or other irregular shaped. The second limiting plate 14 has a second stopping portion 141, and the second limiting portion 141 is adjacent to the short side 113 of the main plate 11. The second stopping portion 141 is a plate integrally extending from one side of the second limiting plate 14, and the second stopping portion 141 is configured to limit the height position of the touch panel 20.

As shown in FIG. 2 to FIG. 4, the first flexible member 15 is integrally connected between the long side 111 of the main plate 11 and the first limiting plate 13. The first flexible member 15 may be a plate with various shapes; for example, the first flexible member 15 may be elongated bar-shaped, rectangular shaped, square shaped, or other irregular shaped. Likewise, the second flexible member 16 is integrally connected between the long side 111 of the main plate 11 and the second limiting plate 14. The second flexible member 16 may be a plate with various shapes; for example, the second flexible member 16 may be elongated bar-shaped, rectangular shaped, square shaped, or other irregular shaped. In other words, in this embodiment, the main plate 11, the first limiting plate 13, the second limiting plate 14, the first flexible member 15, and the second flexible member 16 of the substrate 10 are integrally formed as a one-piece structure. In some embodiments, the substrate 10 may be a rigid plate made of metal (e.g., iron, aluminum, alloy, etc.) or plastic material for providing supporting functions.

As shown in FIG. 2 to FIG. 4, a touch panel 20 is disposed and stacked above the substrate 10. In this embodiment, the touch panel 20 comprises a touchpad 201 and a circuit board 202 which are stacked and fixed with each other, and the circuit board 202 is nearer to the substrate 10 as compared with the touchpad 201 (namely, in this embodiment, the distance between the circuit board 202 and the substrate 10 is less than the distance between the touchpad 201 and the substrate 10). The touchpad 201 is provided for being touched or pressed by the user. The circuit board 202 may perform functions such as scrolling, zooming in, zooming out, opening window, or the like in response to the movement or the gesture of the user's finger(s) on the touchpad 201. Alternatively, in some embodiments, the circuit board 202 may perform functions such as selecting, displaying menu, or the like in response to the click or double click of the user's finger(s) on the touchpad 201.

In some embodiments, the touchpad 201 may be a plate made of glass or polyester resin (mylar), and the circuit board 202 may be a printed circuit board (PCB), a flexible printed circuit board (FPCB), a Rigid-Flex PCB, or other circuit boards. Moreover, neighboring surfaces of the touchpad 201 and the circuit board 202 may be combined with each other by adhesives, chemical glues (e.g., light curable glues), physical glues (e.g., thermosetting glues or thermoplastic glues), or the like, such that the touchpad 201 and the circuit board 202 are integrated as one plate.

As shown in FIG. 2 to FIG. 4, the touch panel 20 has a bottom surface 21, the bottom surface 21 faces the substrate 10 and has a pivot side 211, a swing side 212, a first side 213, and a second side 214. The pivot side 211 and the swing side 212 are at opposite sides, and the first side 213 and the second side 214 are at opposite sides. The first side 213 is connected between the pivot side 211 and the swing side 212, and the second side 214 is connected between the pivot side 211 and the swing side 212. In this embodiment, the shape of the touch panel 20 is rectangular, and a length of the pivot side 211 is greater than a length of the first side 213 and a length of the swing side 212 is greater than a length of the second side 214, respectively, but the instant disclosure is not limited thereto.

As shown in FIG. 2 to FIG. 4, a width of the main plate 11 of the substrate 10 is less than a width of the touch panel 20. That is, in this embodiment, lengths of the two short sides 112, 113 of the main plate 11 are respectively less than the lengths of the first side 213 and the second side 214 of the touch panel 20 (for example, the width of the main plate 11 is one-third, one-fourth, or one-fifth of the width of the touch panel 20), and the main plate 11 is adjacent to the pivot side 211 of the touch panel 20. The pivot side 211 of the touch panel 20 is disposed on the main plate 11 of the substrate 10, so that the touch panel 20 is swingable with respect to the substrate 10 by taking the pivot side 211 as the swing axis. In this embodiment, the bottom surface 21 of the touch panel 20 is provided with a trigger switch 22. For example, the trigger switch 22 may be a button switch or a microswitch, and the trigger switch 22 is adjacent to the swing side 212. Therefore, when the touch panel 20 is pressed and swings with respect to the substrate 10, the swing side 212 moves downward with respect to the substrate 10, so that the trigger switch 22 is triggered to generate signal(s).

As shown in FIG. 2 to FIG. 5, the first limiting plate 13 of the substrate 10 is fixed on the bottom surface 21 of the touch panel 20, the first limiting plate 13 is adjacent to the first side 214 and extends toward the swing side 212, and the first stopping portion 131 of the first limiting plate 13 protrudes from an edge portion of the first side 213. Likewise, the second limiting plate 14 of the substrate 10 is fixed on the bottom surface 21 of the touch panel 2, the second limiting plate 14 is adjacent to the second side 214 and extends toward the swing side 212, and the second stopping portion 141 of the second limiting plate 14 protrudes from an edge portion of the second side 214. Moreover, the first flexible member 15 and the second flexible member 16 are not fixed on the bottom surface 21 of the touch panel 20 and thus are flexible. Therefore, when the touch panel 20 is pressed and swings with respect to the substrate 10, the first flexible member 15 and the second flexible member 16 may deform properly so as to reduce the resistance of the touch panel 20 upon the operation of the touch panel 20.

Based on the above, in the touchpad device 1 according to one or some embodiments of the instant disclosure, the main plate 11, the first limiting plate 13, the second limiting plate 14, the first flexible member 15, and the second flexible member 16 of the substrate 10 are integrally formed as a one-piece structure, the first stopping portion 131 of the first limiting plate 13 protrudes from an edge portion of the touch panel 20, and the second stopping portion 141 of the second limiting plate 14 protrudes from another edge portion of the touch panel 20. Therefore, the height position of the touch panel 20 can be directly limited by the first stopping portion 131 and the second stopping portion 141 of the substrate 10, and additional limiting members are not necessarily required. Hence, the manufacturing costs and the number of the assembling steps can be reduced, thereby increasing the production efficiency of the product and decreasing the weight of the product.

Figure 5:
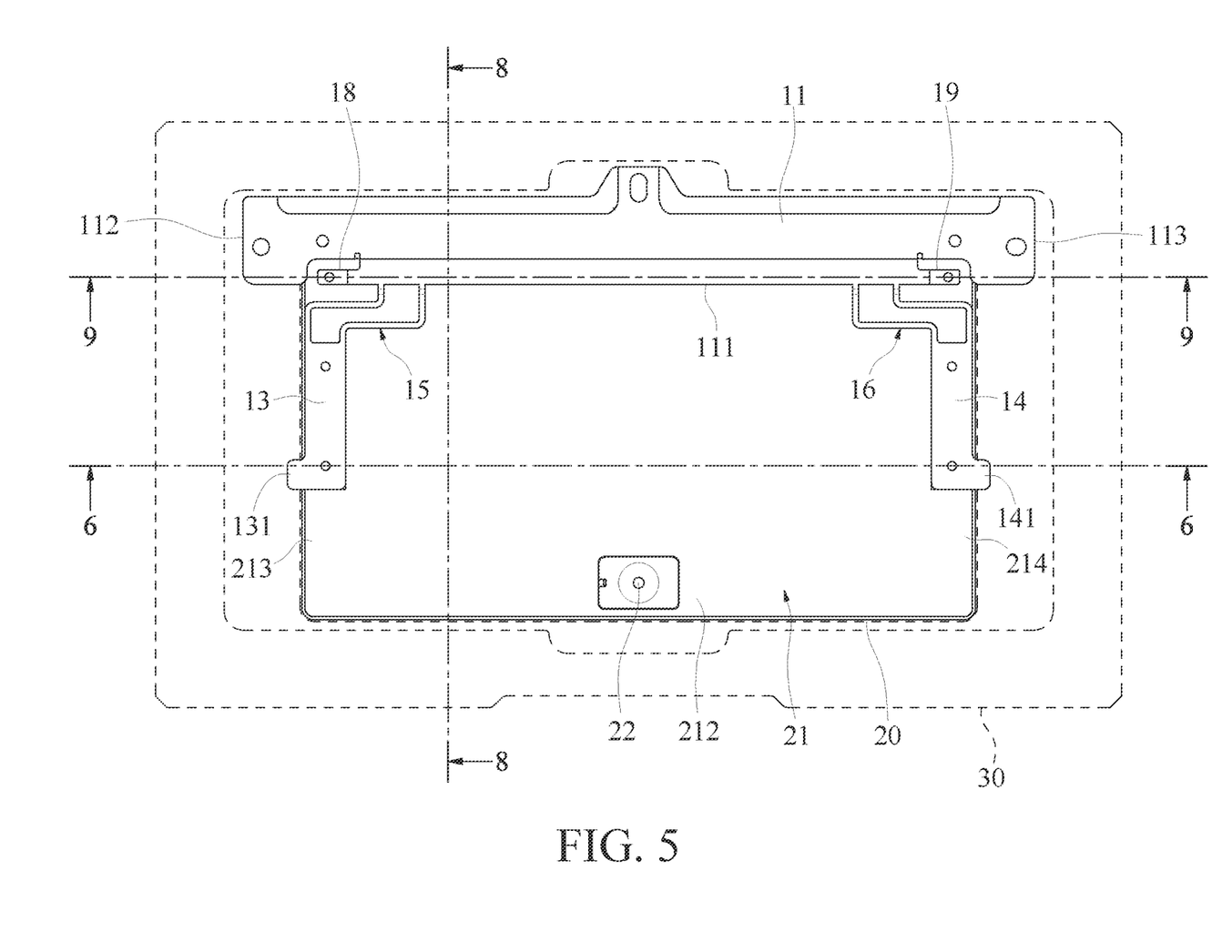
FIG. 5 illustrates a bottom view of the touchpad device of the first embodiment.
Figure 6:
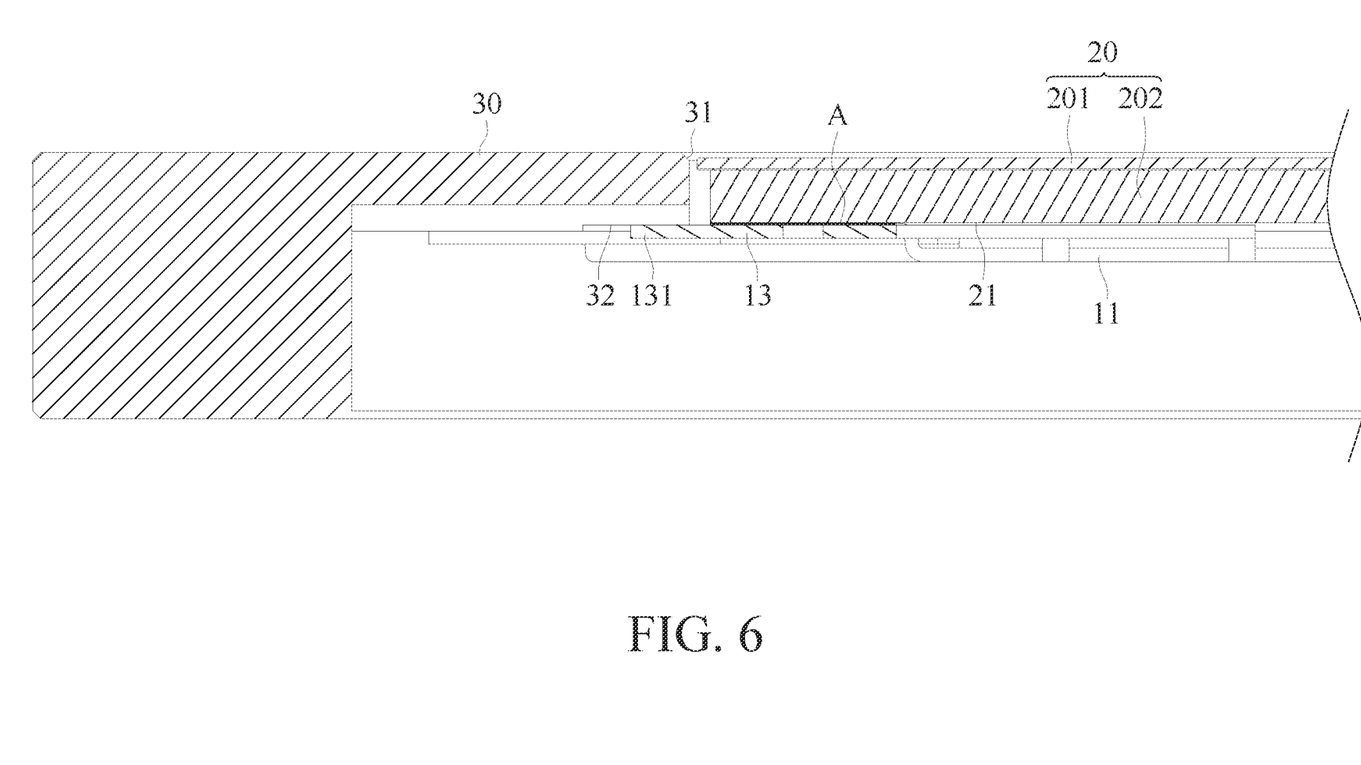
FIG. 6 illustrates a cross-sectional view along line 6-6 shown in FIG. 5.

For example, as shown in FIG. 2, FIG. 5, and FIG. 6, in this embodiment, the touchpad device 1 further comprises a cover plate 30, the cover plate 30 is covered above the touch panel 20 and has a hollow hole 31 and two limiting portions 22, 23. A position of the hollow hole 31 corresponds to a position of the touch panel 20, so that the touch panel 20 can be exposed from the cover plate 30 for user's operation. The two limiting portions 32, 33 are portions of the surface of the bottom portion of the cover plate 30. In this embodiment, the two limiting portions 32, 33 are grooves and at two opposite sides of the cover plate 30. The first stopping portion 131 of the first limiting plate 13 leans against the groove of the limiting portion 32, and the second stopping portion 141 of the second limiting plate 14 leans against the groove of the limiting portion 33, so that the first stopping portion 131 and the second stopping portion 141 can limit the height position of the touch panel 20. Hence, the touch panel 20 can be prevented from protruding out of a top surface of the cover plate to change the product appearance and to affect the operation feeling of the user.

In some embodiments, the substrate 10 of the touchpad device 1 may have a single limiting plate (such as the first limiting plate 13). Therefore, through the cooperation between the first limiting plate 13 and the limiting portion 32 of the cover plate 30 (as shown in FIG. 6), the height position of the touch panel 20 can be limited.

In some embodiments, a surface of the first limiting plate 13 and the bottom surface 21 of the touch panel 20 or a surface of the second limiting plate 14 and the bottom surface 21 of the touch panel 20 are fixed with each other through adhering or soldering. As shown in FIG. 6, take the first limiting plate 13 as an example, in this embodiment, the surface of the first limiting plate 13 and the bottom surface 21 of the touch panel 20 are adhered and fixed with each other through an adhesive layer A. For example, the adhesive layer A may be adhesives, chemical glues (e.g., light curable glues), or physical glues (e.g., thermosetting glues or thermoplastic glues).

Figure 7:
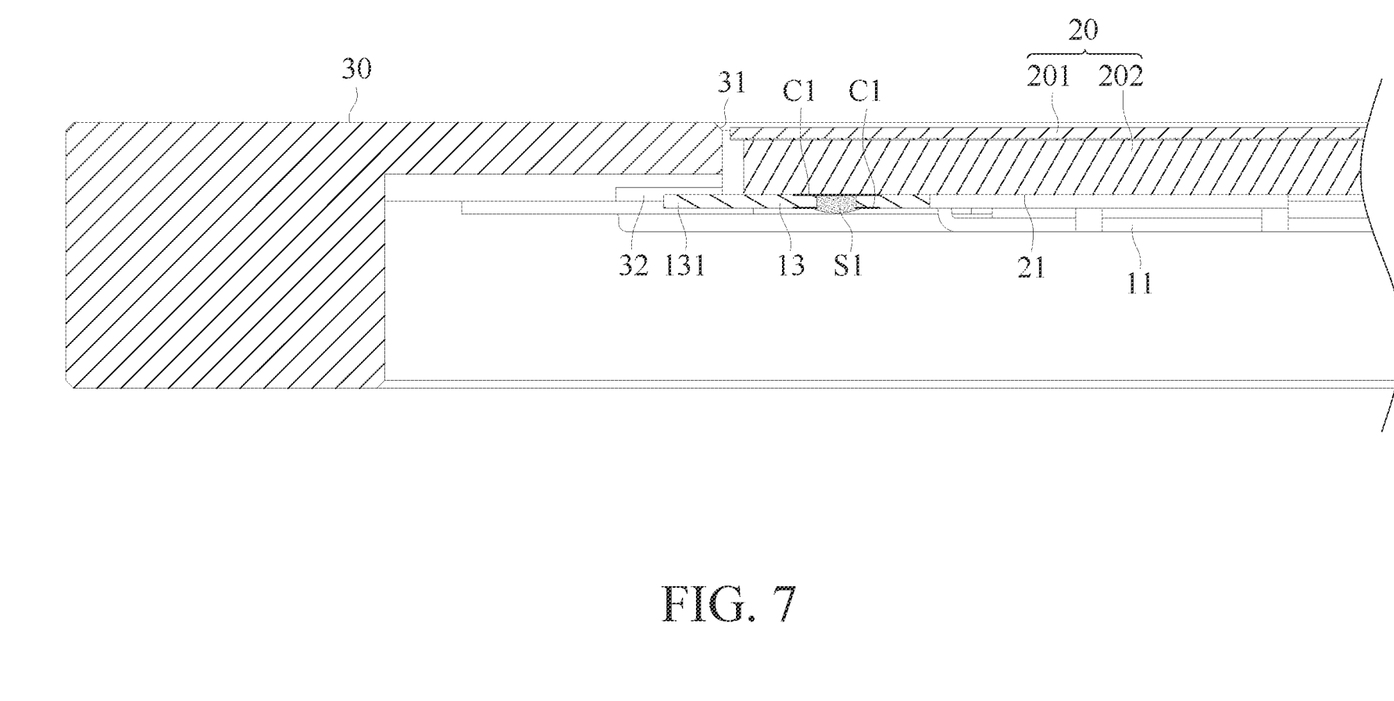
FIG. 7 illustrates a cross-sectional view of a touchpad device according to a second embodiment of the instant disclosure.

Alternatively, as shown in FIG. 7, in the second embodiment of the instant disclosure, the first limiting plate 13 and the bottom surface 21 of the touch panel 20 are soldered and fixed with each other through the solder S1 (such as tin alloy). For example, supposed that the first limiting plate 13 is made of a material with good solderability (such as copper or copper alloy), the first limiting plate 13 and the touch panel 20 can be soldered and fixed with each other through the solder S1 directly. Further, supposed that the first limiting plate 13 is made of a material with poor solderability (such as cast iron, stainless steel, or aluminum), a portion of the surface of the first limiting plate 13 is provided with a metal coating layer C1 (as shown in FIG. 7); the metal coating layer C1 may be made of a material with good solderability (such as copper or copper alloy), so that the first limiting plate 13 is fixed on the bottom surface 21 of the touch panel 20 by soldering the bottom surface 21 of the touch panel 20 and the metal coating layer C1 with the solder S1. Moreover, through the soldering and fixation between the first limiting plate 13 and the touch panel 20, the first limiting plate 13 can be electrically connected to a portion of the circuit board 202 to form a grounding circuit for grounding. Therefore, no additional grounding element is necessarily needed and thus the manufacturing costs for the touchpad device 1 can be further reduced.

In some embodiments, a width of the first flexible member 15 may be less than a width of the first limiting plate 13, and a width of the second flexible member 16 may be less than a width of the second limiting plate 14. Therefore, when the touch panel 20 is pressed and swings with respect to the substrate 10, the resistances generated by the first flexible member 15 and the second flexible member 16 can be greatly reduced, thus preventing the user from pressing the touch panel 20 strenuously and thereby improving the comfort of operation for the user.

Figure 8:
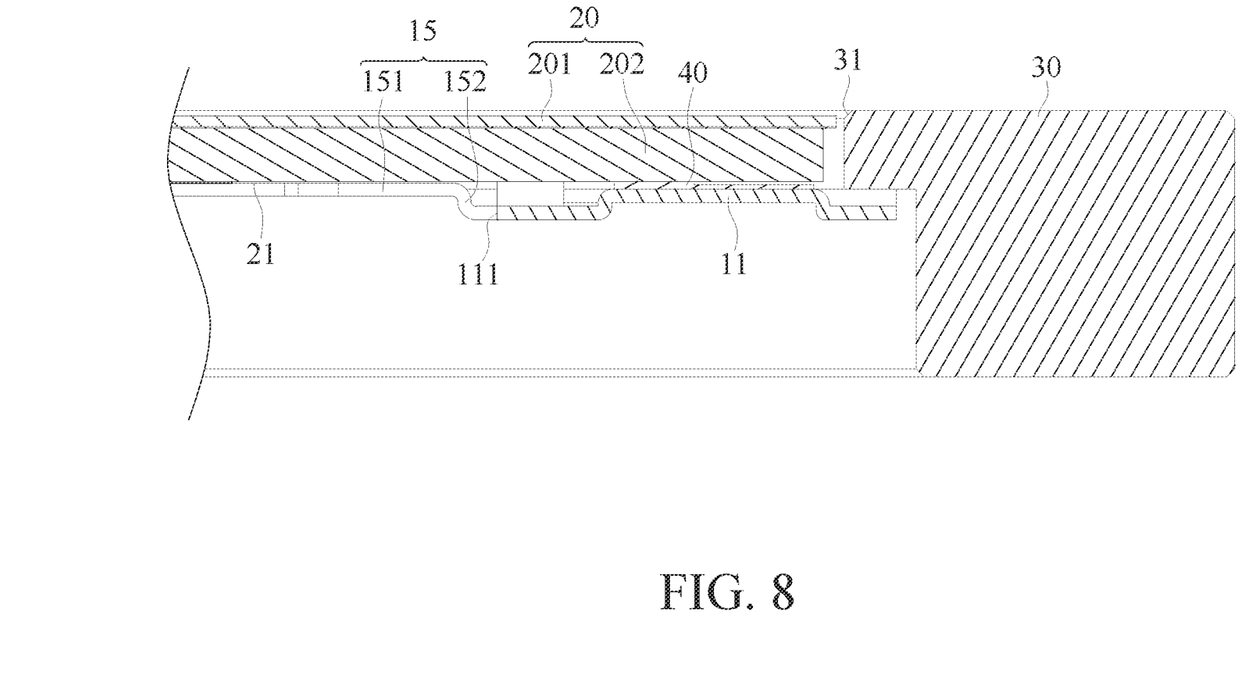
FIG. 8 illustrates a cross-sectional view along line 8-8 shown in FIG. 5.

Further, as shown in FIG. 3, FIG. 5, and FIG. 8, take the first flexible member 15 as an example, in this embodiment, the first flexible member 15 comprises a plurality of elongated plates 151 (in this embodiment, the first flexible member 15 comprises two elongated plates 151, but the number of the elongated plates 151 is not limited thereto). The two elongated plates 151 are spaced apart from each other, and a width of each of the elongated plates 151 is less than the width of the first limiting plate 13. For example, the width of the elongated plate 151 may be one third, one fourth, or one fifth of the width of the first limiting plate 13. The width of the elongated plate 151 can be determined according to the resistance generated by the first flexible member 15 to be overcome by the touch panel 20 when the touch panel 20 is pressed and swings with respect to the substrate 10. Each of the elongated plates 151 contacts the bottom surface 21 of the touch panel 20, one of two ends of each of the elongated plates 151 is integrally connected to the first limiting plate 13, and the other end of each of the elongated plates 151 has a bent portion 152. In this embodiment, because the first limiting plate 13 abuts against the circuit board 202, a height difference is between the first limiting plate 13 and the main plate 11, and thus the bent portion 152 is bent downward and integrally connected to the long side 111 of the main plate 11. Therefore, through the configuration of the bent portion 152, the first flexible member 15 can be integrally connected to the main plate 11 and the first limiting plate 14 at different height positions, and thus the applied amount of the adhesives can be reduced. Moreover, when the touch panel 20 is pressed and swings with respect to the substrate 10, the bent portion 152 can be bent and deformed, thereby preventing the concentration of the stress, thereby further reducing the resistance encountered by the touch panel 20 during the operation of the touch panel 20.

As shown in FIG. 3, in this embodiment, the first limiting plate 13 has a side 132 facing the main plate 11. The two elongated plates 151 of the first flexible member 15 are integrally connected to two opposite ends of the side 132, respectively, so that a proper connection strength is between the first flexible member 15 and the first limiting plate 13, preventing the elongated plate 151 from being deformed or broken during the operation of the touch panel 20. Moreover, through the configuration that the two elongated plates 151 of the first flexible member 15 are integrally and respectively connected to two opposite ends of the side 132, the forces applied to the two elongated plates 151 can be more evenly.

Further, as shown in FIG. 3, each of the elongated plates 151 of the first flexible member 15 may have at least one bent section 153. In this embodiment, each of the elongated plates 151 has two bent sections 153 which are thin and long and the two bent sections 153 each is formed as an S-shaped structure, an L-shaped structure, an I-shaped structure, or an N-shaped structure, but the instant disclosure is not limited thereto. In this embodiment, the purpose of the bent section 153 is that, when the touch panel 20 is pressed and swings with respect to the substrate 10, the resistances generated by the elongated plates 151 can be greatly reduced, thereby improving the comfort of operation for the user.

As shown in FIG. 3 and FIG. 4, the structure of the second flexible member 16 may be the same as or similar to the structure of the first flexible member 15; for example, the first flexible member 15 and the second flexible member 16 may be arranged symmetrically, and repeated descriptions are thus omitted herein.

Figure 10:
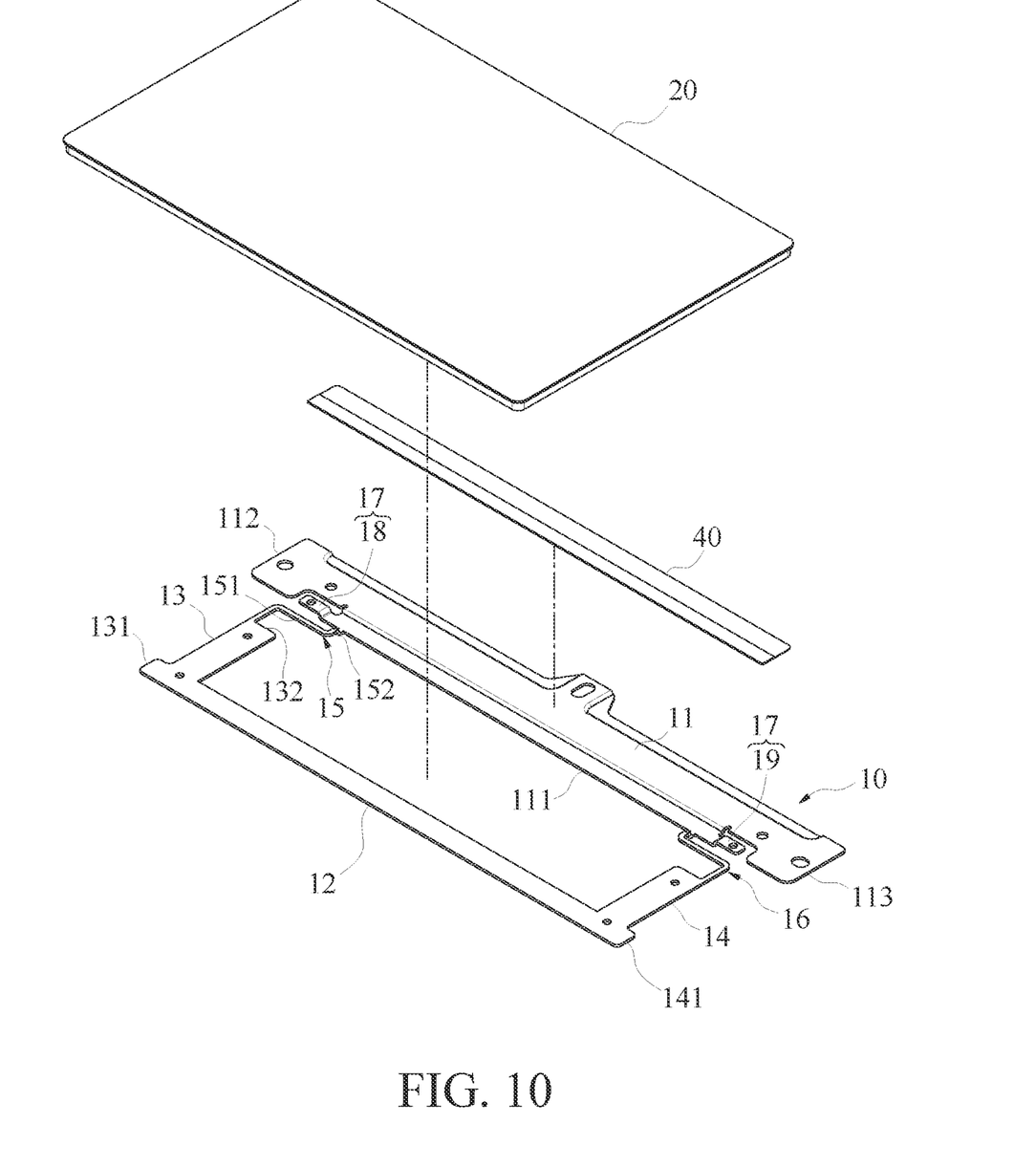
FIG. 10 illustrates an exploded view of a touchpad device according to a third embodiment of the instant disclosure.

In some embodiments, the first flexible member 15 may comprise a single elongated plate 151. As shown in FIG. 10, in the third embodiment of the instant disclosure, the first flexible member 15 may comprise one elongated plate 151. The elongated plate 151 contacts the bottom surface 21 of the touch panel 20, one of two ends of the elongated plate 151 is integrally connected to the first limiting plate 13, and the other end of the elongated plate 151 has a bent portion 152, and the bent portion 152 is integrally connected to the long side 111 of the main plate 11. Moreover, in this embodiment, the substrate 10 further comprises a reinforcement plate 12. The reinforcement plate 12 is integrally connected between the first limiting plate 13 and the second limiting plate 14 to enhance the overall structural strength of the substrate. Moreover, through the configuration of the reinforcement plate 12, the elongated plate 151 can be prevented from being deformed or broken during the operation of the touch panel 20.

Figure 9:
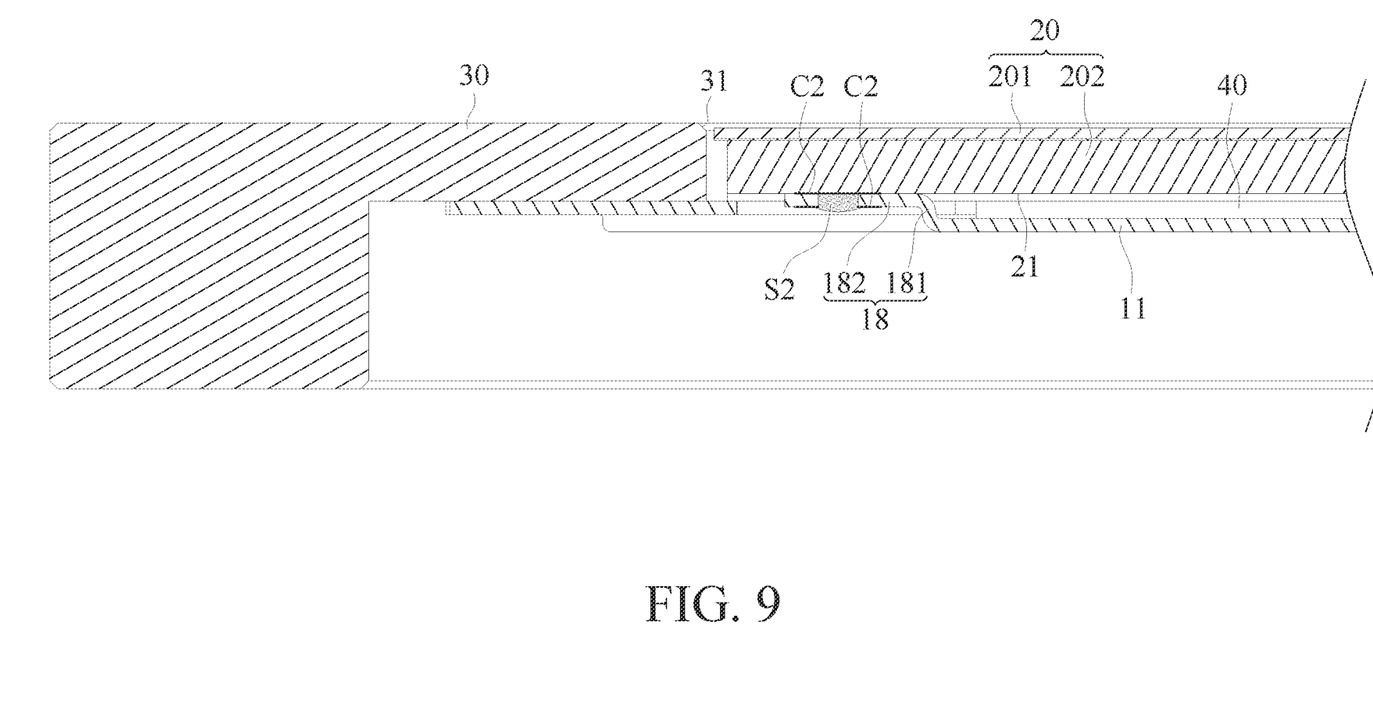
FIG. 9 illustrates a cross-sectional view along line 9-9 shown in FIG. 5.

As shown in FIG. 2 and FIG. 9, the touchpad device 1 further comprises a spacing member 40. In this embodiment, the spacing member 40 is an elongated member having a certain thickness, the material of the spacing member 40 may be metal, plastic, rubber, silicone, sponge, or the like, and the spacing member 40 is fixed between the main plate 11 and the pivot side 211 of the bottom surface 21 of the touch panel 20. Therefore, a spacing is between the touch panel 20 and the substrate 20. Hence, an enough space is provided for the touch panel 20 to move with respect to the substrate 10 in a swinging manner through the pivot side 211. In some embodiments, the spacing member 40 may be fixed between the main plate 11 and the touch panel through adhering, spot-welding, hot-melting, locking, or the like. For example, the two surfaces of the spacing member 40 contacting the main plate 11 and the bottom surface 21 may be respectively provided with adhesives, so that the touch panel 20, the spacing member 40, and the main plate 11 are adhered and fixed with each other.

Furthermore, as shown in FIG. 2, in this embodiment, the main plate 11 is further provided with a fixation member 17. The fixation member 17 is configured to fix the main plate 11 on the bottom surface 21 of the touch panel 20, thereby further enhancing the fixation effect between the main plate 11 and the touch panel 20. Moreover, because the fixation member 17 is fixed on the touch panel 20, the spacing member 40 is sandwiched between the main plate 11 and the touch panel 20. Hence, the fixation effect of the spacing member 40 can be enhanced.

As shown in FIG. 2 to FIG. 4 and FIG. 9, in this embodiment, the fixation member 17 comprises a first bent plate 18 and a second bent plate 19. The first bent plate 18 and the second bent plate 19 are integrally bent upward from the main plate 11. For example, the first bent plate 18 and the second bent plate 19 may be bent plates having an L-shaped structure, a U-shaped structure, a T-shaped structure, or other shapes. The first bent plate 18 and the second bent plate 19 are respectively at two opposite ends of the main plate 11. The first bent plate 18 has a first longitudinal plate 181 and a first transversal plate 182, the first transversal plate 182 is integrally connected to a top portion of the first longitudinal plate 181 and fixed on the bottom surface 21 of the touch panel 20. The second bent plate 19 has a second longitudinal plate 191 and a second transversal plate 192, the second transversal plate 192 is integrally connected to a top portion of the second longitudinal plate 191 and fixed on the bottom surface 21 of the touch panel 20.

In some embodiments, the fixation member 17 on the main plate 11 and the bottom surface 21 of the touch panel 20 may be soldered and fixed with each other. As shown in FIG. 9, take the first bent plate 18 of the fixation member 17 as an example, the first transversal plate 182 of the first bent plate 18 and the bottom surface 21 of the touch panel 20 are soldered and fixed with each other through a solder S2 (for example, tin alloy). Supposed that the first bent plate 18 is made of a material with good solderability (such as copper or copper alloy), the first transversal plate 182 and the touch panel 20 can be soldered and fixed with each other through the solder S2 directly. Further, supposed that the first bent plate 18 is made of a material with poor solderability (such as cast iron, stainless steel, or aluminum), a portion of the surface of the first bent plate 18 is provided with a metal coating layer C2; the metal coating layer C2 may be made of a material with good solderability (such as copper or copper alloy), so that the first transversal plate 182 is fixed on the bottom surface 21 of the touch panel 20 by soldering the bottom surface 21 of the touch panel 20 and the metal coating layer C2 with the solder S2. Moreover, through the soldering and fixation between the first bent plate 18 and the touch panel 20, the first limiting plate can be electrically connected to a portion of the circuit board 202 to form a grounding circuit for grounding. Therefore, no additional grounding element is necessarily needed and thus the manufacturing costs for the touchpad device 1 can be further reduced.

Figure 11:
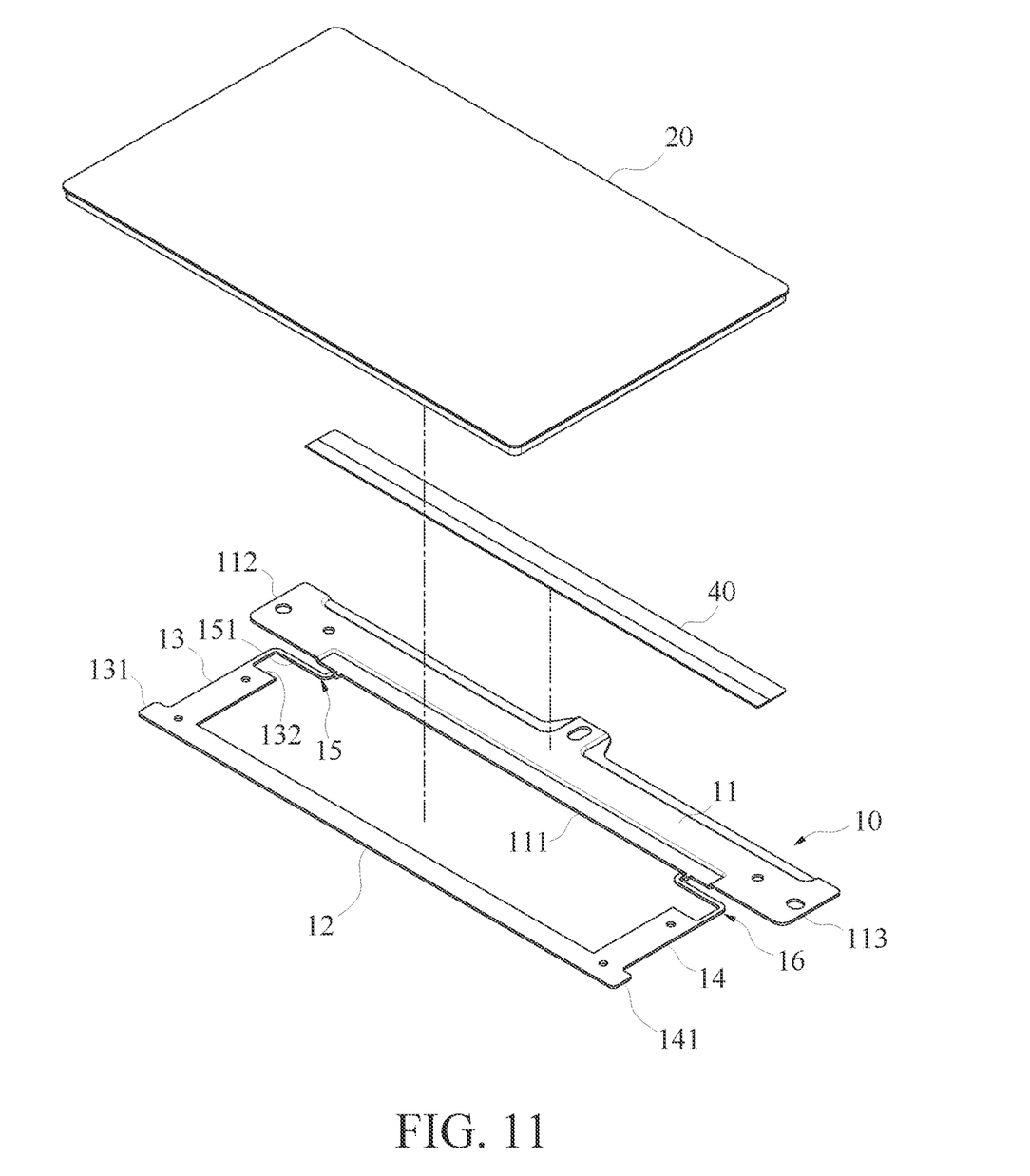
FIG. 11 illustrates an exploded view of a touchpad device according to a fourth embodiment of the instant disclosure.

As shown in FIG. 11, in the fourth embodiment of the instant disclosure, the substrate 10 of the touchpad device 1 may be devoid of the fixation member 17; instead, in this embodiment, the first limiting plate 13 and the second limiting plate 14 are soldered and fixed on the bottom surface 21 of the touch panel 20 to form a grounding circuit for grounding. Therefore, the manufacturing costs and the number of the assembling steps of the touchpad device 1 can be reduced effectively.

Based on the above, in the touchpad device according to one or some embodiments of the instant disclosure, the first flexible member is connected between the long side of the main plate and the first limiting plate (that is, in some embodiments, the main plate, the first flexible member, and the first limiting plate are integrally formed as a one-piece structure), and the first stopping portion of the first limiting plate protrudes from an edge portion of the touch panel. Therefore, the height position of the touch panel can be directly limited by the first stopping portion of the substrate, and additional limiting members are not necessarily required. Hence, the manufacturing costs and the number of the assembling steps of the touchpad device can be reduced, thereby increasing the production efficiency of the product and decreasing the weight of the product.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A touchpad device comprising:
    a substrate comprising a main plate, a first limiting plate, and a first flexible member, wherein the main plate has a long side and a short side, the first limiting plate has a first stopping portion, the first flexible member is integrally connected between the long side and the first limiting plate, and the first limiting plate is adjacent to the short side; and
    a touch panel disposed above the substrate, wherein the touch panel has a bottom surface, the bottom surface has a pivot side and a swing side opposite to the pivot side and has a first side and a second side opposite to the first side, the first side and the second side are connected between the pivot side and the swing side, the pivot side is disposed on the main plate, the first limiting plate of the substrate is fixed on the bottom surface and adjacent to the first side, and the first stopping portion of the first limiting plate protrudes from an edge portion of the first side;
    wherein one of two sides of a spacing member is fixed to the pivot side of the bottom surface of the touch panel, and the other side of the spacing member is fixed to the main plate to maintain a spacing between the touch panel and the main plate, so that when the touch panel is pressed, the touch panel swings with respect to the main plate through the pivot side; one of two ends of the first flexible member is integrally connected to the first limiting plate, the other end of the first flexible member is integrally connected to the long side of the main plate, and the first flexible member is not fixed on the bottom surface of the touch panel.

2. The touchpad device according to claim 1, further comprising a cover plate, wherein the cover plate is covered above the touch panel and has a hollow hole and a limiting portion, a position of the hollow hole corresponds to a position of the touch panel, and the first stopping portion of the first limiting plate leans against the limiting portion.

3. The touchpad device according to claim 1, wherein the bottom surface of the touch panel is provided with a trigger switch, and the trigger switch is adjacent to the swing side.

4. The touchpad device according to claim 1, wherein the main plate has another short side, the substrate comprises a second limiting plate and a second flexible member, the second limiting plate is adjacent to the another short side and has a second stopping portion, the second flexible member is integrally connected between the long side and the second limiting plate, the second limiting plate is fixed on the bottom surface of the touch panel and adjacent to the second side, and the second stopping portion of the second limiting plate protrudes from an edge portion of the second side.

5. The touchpad device according to claim 4, wherein the substrate further comprises a reinforcement plate, and the reinforcement plate is integrally connected between the first limiting plate and the second limiting plate.

6. The touchpad device according to claim 1, wherein a width of the first flexible member is less than a width of the first limiting plate.

7. The touchpad device according to claim 1, wherein the first flexible member comprises an elongated plate, the elongated plate contacts the bottom surface of the touch panel, one of two ends of the elongated plate is integrally connected to the first limiting plate, the other end of the elongated plate has a bent portion, and the bent portion is integrally connected to the long side of the main plate.

8. The touchpad device according to claim 7, wherein the elongated plate further has at least one bent section.

9. The touchpad device according to claim 1, wherein the first flexible member comprises a plurality of elongated plates spaced apart from each other, each of the elongated plates contacts the bottom surface of the touch panel, one of two ends of each of the elongated plates is integrally connected to the first limiting plate, the other end of each of the elongated plates has a bent portion, and the bent portion is integrally connected to the long side of the main plate.

10. The touchpad device according to claim 9, wherein the first limiting plate has a side facing the main plate, and the elongated plates are respectively connected to two opposite ends of the side.

11. The touchpad device according to claim 1, wherein a surface of the first limiting plate and the bottom surface of the touch panel are adhered and fixed with each other through an adhesive layer.

12. The touchpad device according to claim 1, wherein a surface of the first limiting plate and the bottom surface of the touch panel are soldered and fixed with each other through a solder.

13. The touchpad device according to claim 12, wherein the surface of the first limiting plate is further provided with a metal coating layer, and the solder is connected between the bottom surface of the touch panel and the metal coating layer.

14. The touchpad device according to claim 1, wherein the main plate is further provided with a fixation member, and the fixation member is fixed on the bottom surface of the touch panel.

15. The touchpad device according to claim 14, wherein the fixation member comprises a first bent plate, the first bent plate is integrally bent upward from the main plate, the first bent plate has a first longitudinal plate and a first transversal plate, and the first transversal plate is integrally connected to a top of the first longitudinal plate and fixed on the bottom surface of the touch panel.

16. The touchpad device according to claim 15, wherein the fixation member comprises a second bent plate, the second bent plate is integrally bent upward from the main plate, the second bent plate has a second longitudinal plate and a second transversal plate, the second transversal plate is connected to a top of the second longitudinal plate and fixed on the bottom surface of the touch panel, and the first bent plate and the second bent plate are at two opposite ends of the main plate.

17. The touchpad device according to claim 14, wherein the fixation member and the bottom surface of the touch panel are soldered and fixed with each other.

* * * * *